United States Patent [19]

Noble

[11] Patent Number: 4,772,941

[45] Date of Patent: Sep. 20, 1988

[54] VIDEO DISPLAY SYSTEM

[75] Inventor: Stephen A. Noble, Rochester, N.Y.

[73] Assignee: Eastman Kodak Company, Rochester, N.Y.

[21] Appl. No.: 108,877

[22] Filed: Oct. 15, 1987

[51] Int. Cl.$^4$ ............................ G03F 3/10; H04N 9/74
[52] U.S. Cl. ........................................ 358/76; 358/22; 358/183
[58] Field of Search ............................ 358/22, 76, 183

[56] References Cited

U.S. PATENT DOCUMENTS

| | | | |
|---|---|---|---|
| 3,941,925 | 3/1976 | Busch et al. | 358/183 |
| 4,200,890 | 4/1980 | Inaba et al. | 358/183 |
| 4,238,773 | 12/1980 | Tsuboka et al. | 358/183 |
| 4,334,245 | 6/1982 | Michael | 358/183 |
| 4,360,831 | 11/1982 | Kellar | 358/182 |
| 4,392,156 | 7/1983 | Duca et al. | 358/183 |
| 4,420,770 | 12/1983 | Rahman | 358/22 |
| 4,432,014 | 2/1984 | Roos et al. | 358/111 |
| 4,496,983 | 1/1985 | Takenaka | 358/76 |
| 4,570,182 | 2/1986 | Johnson | 358/183 |
| 4,571,619 | 2/1986 | Mewitz | 358/160 |
| 4,694,354 | 9/1987 | Tanaka et al. | 358/76 |

FOREIGN PATENT DOCUMENTS

| | | | |
|---|---|---|---|
| 48112 | 12/1981 | Japan | 358/76 |
| 142077 | 9/1982 | Japan | 358/183 |
| 61-187081 | 8/1986 | Japan . | |

*Primary Examiner*—John W. Shepperd
*Attorney, Agent, or Firm*—Jeffrey L. Brandt

[57] ABSTRACT

A video display system for displaying still frame images which emulate photographic images by being bordered with a mask of selected dimensions; the mask being selected from several masks so as to display the image with a desired aspect ratio. The video image is stored in a frame store. A memory having two arrays which map the video screen in x and y coordinates, respectively, provides storage for a plurality of sets of x and y coordinate data each of which sets define a different one of the masks. The memory may be addressed by a computer and supplied with data to change any one or more of the available masks. The memory is scanned while the frame store is read out in synchronism with the scanning of the memory. Registers are provided for storing digitized video information representing a border of a selected color. The memory is read out to provide mask signals which control the multiplexing of data from the mask registers or the frame store to a digital output bus. Digital information representing images with the selected mask is available on the output bus and may be stored in a digital recorder and then converted into images for viewing on a monitor, or the information on the digital bus may be converted directly into analog form and applied to the monitor for viewing. The system enables proofing of the images without the delay in printing photographic prints for proofing and selecting such prints as are desired by customer.

11 Claims, 4 Drawing Sheets

VIDEO DISPLAY SYSTEM

The present invention relates to a video display system, and in particular to a system for displaying video images with one of a plurality of selectable masks defining the borders of the images.

The invention is especially suitable for use in providing still video proofs of photographic images, thereby enabling a customer, for example in a portrait studio, to select desired prints without waiting for the development of proof prints.

Various techniques have been proposed for generating masks about different areas of a video image. Most masks are of a particular design, such as circular (see U.S. Pat. No. 4,571,619 issued Feb. 18, 1986 to Mewitz). Other techniques are principally for use in television studios to generate special effects. See Bush et al., U.S. Pat. No. 3,941,925 issued Mar. 2, 1976; Michael, U.S. Pat. No. 4,334,245 issued June 8, 1982; Kellar, U.S. Pat. No. 4,360,831 issued Nov. 23, 1982; Duca et al., U.S. Pat. No. 4,392,156 issued July 5, 1983; Johnson et al., U.S. Pat. No. 4,570,182 issued Feb. 11, 1986 and Yoshida, U.S. Pat. No. 4,569,079 issued Feb. 4, 1986. Such systems generally are designed to provide one particular mask, and not designed to provide a plurality of masks which are available for selection. It is a feature of this invention to make available a plurality of selectable masks so as to readily display video proofs with different aspect ratios. Such proofs can, for example, facilitate the selection of a desired picture in a desired format; for example 5×7; 8×10 or 1×1, as by a customer interested in acquiring prints of the images.

Accordingly, it is the principal object of the present invention to provide an improved system for the generation of masks upon a video image which provides video displays with any one of a plurality of mask aspect ratios.

It is a further object of the present invention to provide an improved video display system which provides masked video images which can be displayed for video proofing.

It is a still further object of the present invention to provide an improved system for video image generation wherein any of a plurality of masks may be generated to provide a bordered video display wherein the masks can be of a selected color to complement the video image.

Briefly described, the invention provides a video system for displaying masked images on a video monitor with a selected one of a plurality of different masks. These masks define the borders of the images. The masked images can be used to display video proofs with selected formats having selected photographic aspect ratios to assist in the selection of photographic prints.

In accordance with the present invention, a video system for displaying masked video images with a selected one of a plurality of bordering masks on a video monitor comprises first memory means for storing digital video data defining at least one of the video images to be displayed. Second memory means are provided for storing digital mask data respecting a plurality of coordinates which define the inner edges of the masks. Means are provided for addressing the first memory means to store said digital mask data for a plurality of different ones of said masks. Means are provided for synchronously scanning the first and second memory means to read the digital video data, and the digital mask data for a selected one of the masks. Means are supplied for providing digital mask color data defining the color of the selected mask. Finally, means responsive to the digital mask data are provided for selecting the digital color data outside of the mask inner edges and the digital video data inside of the mask inner edges so as to provide video information for displaying the masked video images on the monitor.

The foregoing and other objects, features and advantages of the invention as well as presently preferred embodiments thereof, will become more apparent from a reading of the following description in connection with the accompanying drawings in which.

Figure 1:
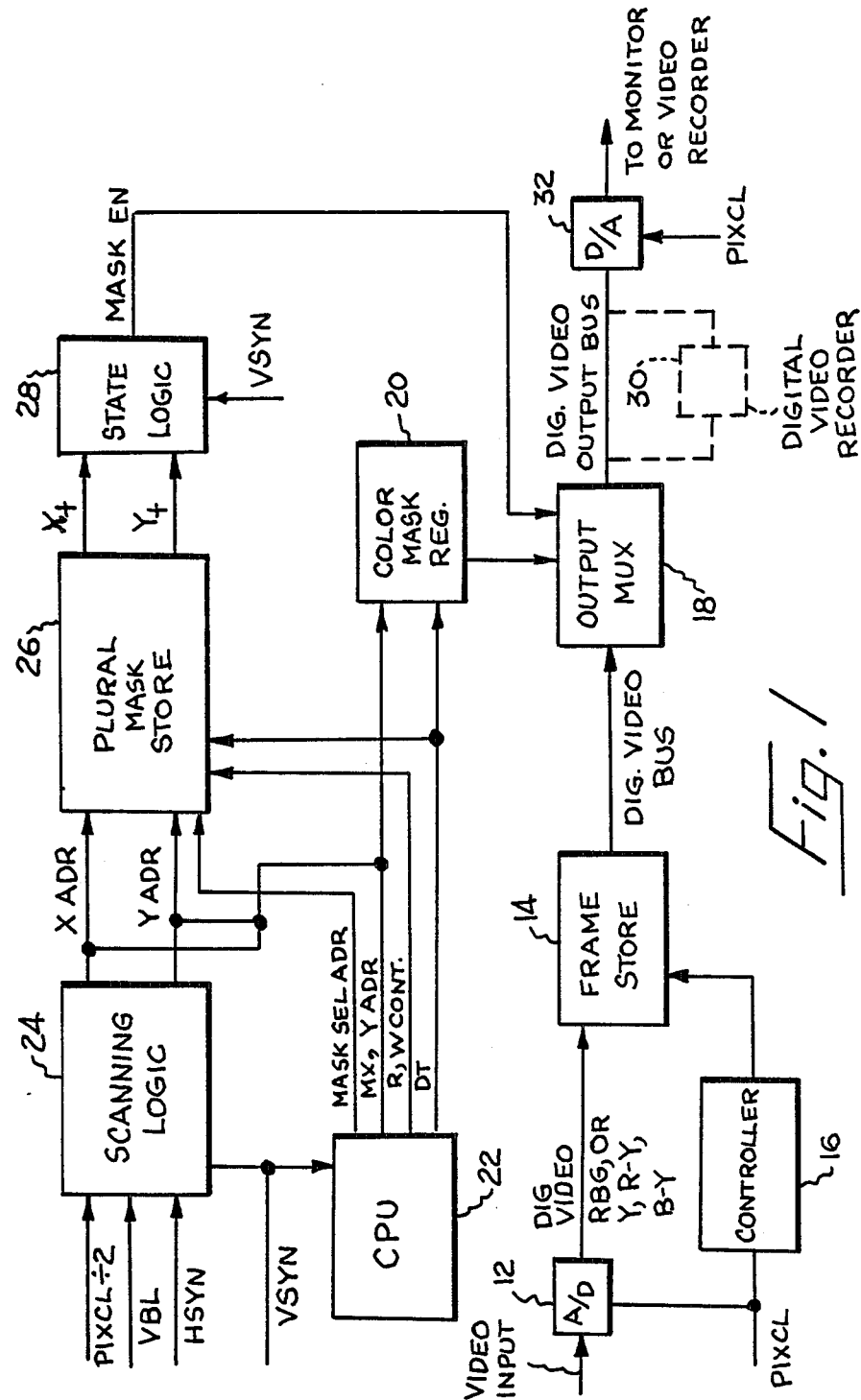
FIG. 1 is a block diagram illustrating generally a video display system in accordance with the invention.

Referring more particularly to FIG. 1, a video signal input is derived from a video camera (not shown), such as a CCD camera in which synchronizing signals and blanking signals are generated. These synchronizing signals include horizontal sync (HSYN), vertical sync (VSYN) and vertical blanking (VBL). A pixel clock (PIXCL) is also generated in the camera equipment to provide 512 pixels per horizontal line. This clock operates, for example, at approximately 9.8 MHz, and can be generated by conventional means, such as by multiplying the horizontal sync rate signals HSYN by 624 using a phase locked loop circuit.

When used to provide video proofs of photographic prints, the video camera is positioned relative to a conventional photographic camera (not shown) so as to view substantially the same subject. The output of the video camera preferably comprises primary color signals (red, blue and green—RBG) or luminesce and chrominance signals, Y, R-Y and B-Y—the latter also being known as I and Q signals. These video signals are digitized by analog to digital converters (A/D) 12 in each line to provide digital video signals. A/D converters 12 provide samples at the pixel clock (PIXCL) rate. A frame store 14 is provided, connected to the A/D converters 12, for storing at least one frame of video information byte wise, at the PIXCL clock rate, under the control of a controller circuit 16. Frame store 14 has three planes which, in the case of RGB video data, are each preferably 512 by 512 bytes wide. In the event that chrominance, R-Y, B-Y, Y data is used, frame store 14 need comprise only 128 bytes in the horizontal or X direction for the R-Y and B-Y channels. In the latter case, the R-Y and B-Y analog channels are clocked at ¼ the PIXCL rate, in order to take advantage of the lower band width of the R-Y and B-Y chrominance data. The frame of video information is mapped into frame store 14 with 512 lines in the vertical, or Y, direction, so as to enable interlacing of approximately 256 lines (or 242 if the half lines of the top and bottom of the image are not included) to form a standard, NTSC compatible video display.

Frame store 14 is connected to a digitized video output bus having three channels, each channel carrying eight bit bytes for one component of the video signal.

The digital video bus is connected to an output multiplexer 18. Another input to the multiplexer is from a color mask register 20. Output mux 18 is controlled, as will be described below, such that either the mask data from register 20 or the digitized video data from frame store 14 is multiplexed to a digitized video output bus. In a color environment, the data supplied by color mask register 20 represents different mask colors as selected by appropriate programming of the register via a computer, indicated as a CPU or central processing unit 22. In a black and white environment, color mask register 20 contains 'color' data representing a black, white, or intermediate gray density. Color mask registers 20 are addressed via the computer's address lines (X, Y ADR) and the color mask data is supplied over data lines (DT). A mask enable signal (MASK EN) controls the multiplexer 18.

The generation of the mask enable signals which define a selected one of a plurality of masks is accomplished by means of scanning logic 24, a plural mask store 26 and a state logic unit 28. Mask store 26 is addressed for data reading and writing under control of the CPU 22. The CPU 22 also provides a mask select address to the mask store 26 for reading out a selected one of a plurality of masks stored in the mask store memory 26. The scanning logic 24 is synchronized by the video synchronizing signals. The PIXCL clock times the addressing of the mask store with the X address lines (X ADR), and the horizontal sync times the Y addressing with the Y address lines (Y ADR). VSYN is input to the CPU 22 to inhibit addressing and routing data into the mask store except during the vertical blanking interval.

Briefly describing the operation of the video display system diagrammed in FIG. 1, the system is used to display a video image on a monitor (not shown) at the output of a D/A converter 32. The mask store 26 contains arrays which map the video image in both the X and Y directions. In these arrays there are locations for storage of a plurality of masks. The masks are defined by data in locations in X arrays and in Y arrays which are loaded into plural mask store 26 from the CPU 22. Loading or writing occurs when the CPU addresses the mask store via its X, Y ADR lines and supplies data via the DT lines, during a write mode established by read/- write control lines (R, W CONT). To display the desired video image on the monitor, the plural mask store 26 is read out by the scanning logic 24. Mask store 26 provides data bits, indicated as $X_t$ and $Y_t$ from the X and Y arrays, respectively, which represent coordinates on the display defining the coordinates of the selected mask. State logic unit 28 implements the below described logical functions to control output mux 18 as a function of the $X_t$ and $Y_t$ data bits. State logic unit 28 comprises, for example, an integrated circuit known as a "Registered PAL" which has programmable latches and gates. A suitable Registered PAL is of the type commonly referred to as a PAL20RA10.

Figure 4:
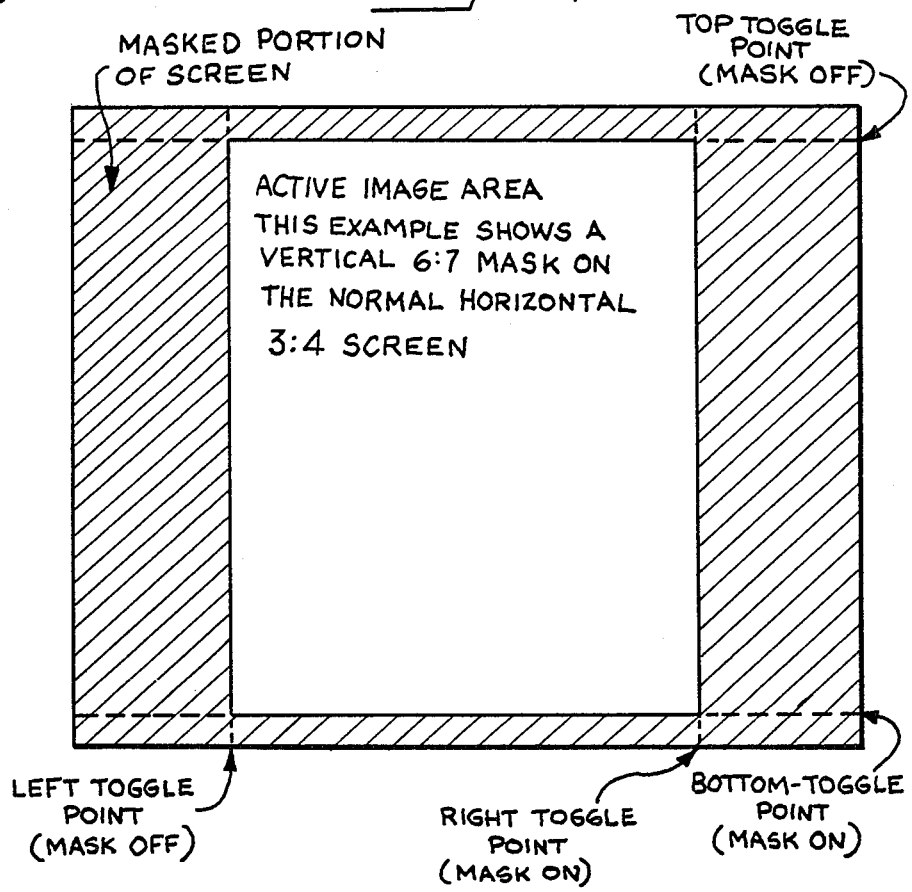
FIG. 4 is a view of a video monitor screen showing the display of a mask image which is generated in accordance with the invention.

FIG. 4 illustrates a typical mask bordering a horizontally formatted video image having a 3:4 aspect ratio. The mask shown is a vertical 6:7 aspect ratio mask. To display the masked video display of FIG. 4, plural mask store 26 is programmed by CPU 22 to contain data in the X array defining the coordinates in the horizontal video line dimension at what is indicated as the left toggle point (mask off) and the right toggle point (mask on). It will be noted that this toggle point is the same for each horizontal video line. The Y array of the mask store 26 is programmed by CPU 22 to contain data in the vertical image dimension defining the top toggle point (mask off) and the bottom toggle point (mask on). These toggle points thus define the inner edges of the mask. As will be described in greater detail below, a plurality of toggle point data can be stored in the mask store 26 so as to define masks in various aspect ratios that are compatible with various camera formats and photographic prints which include but are not limited to 5×7 and 8×10 formats which are most popular for portrait photographic prints.

Alternatively to directly displaying the video image on a monitor, the digitized video output may be connected to a digital video recorder 30 as shown in dashed lines at the output of MUX 18, which can then connect the digital video channels for delayed playback to the digital analog converter 32 at the PIXCL rate. Further, a separate frame of video information can be stored in frame store 14, and subsequently in video recorder 30, every time a photographic image is taken. Several video images can then be taken and generated with masks. These images are stored on the recorder 30 and then can be played back to the customer for video proofing, thereby reducing the cycle time otherwise required for making photographic print proofs for use by the customer in selecting the desired prints.

Figure 2A:
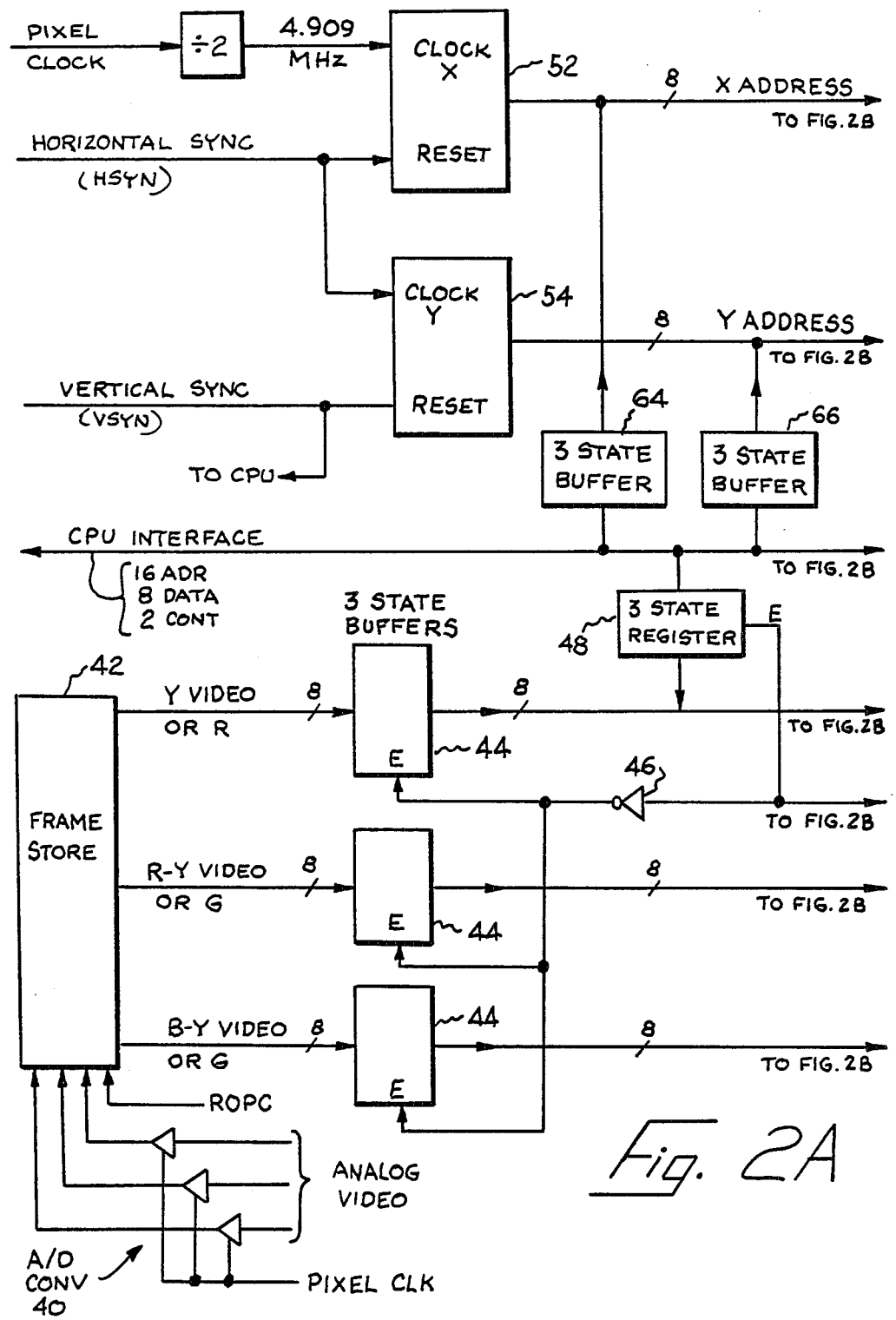
FIGS. 2A and 2B are block diagrams illustrating an embodiment of the system shown in FIG. 1, and other aspects of the system, in greater detail.
Figure 2B:
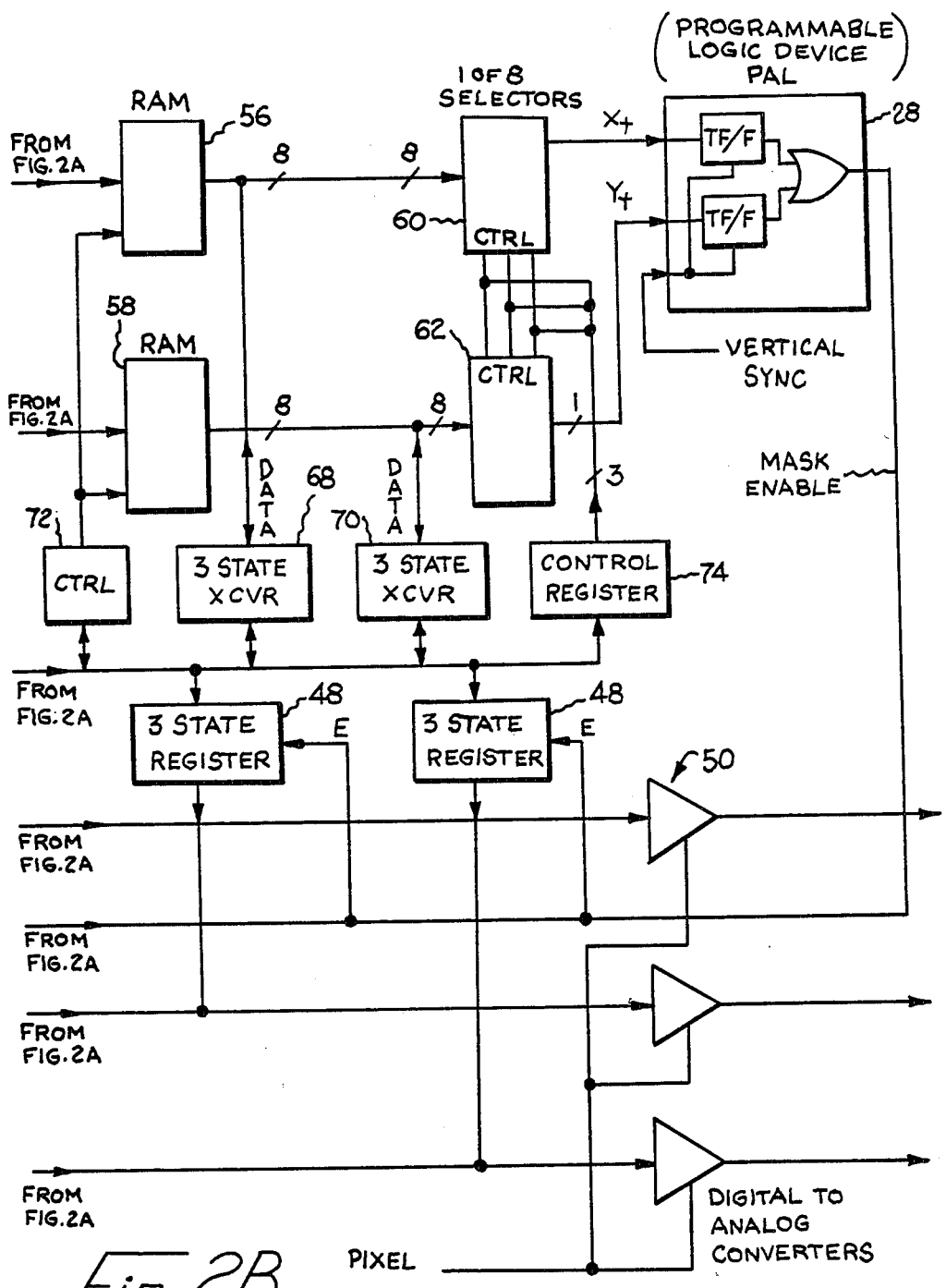

Referring now to FIG. 2 there is shown an embodiment of the system wherein three channels of (R, G and B) or luminence (Y, R-Y, and B-Y) analog video signals are digitized by a bank of analog to digital converters 40 operating at the approximate pixel clock rate, and read into the frame store 42. The frame store is read out by the Read Out Pixel Clock (ROPC) to a digitized video output bus via tri-state buffers 44. These buffers are part of the multiplexer 18 (FIG. 1). When the mask enable is a binary one, it is inverted in an inverter 46 and applied to the enable input of the buffers 44 where it tri-states the output of the buffer. Tri-state registers 48 comprise the mask register 20 (FIG. 1), and are enabled by the mask enable signal when it is a binary, logical one bit to apply the byte stored in the registers 48 to the digitized video output bus. The digital video output bus is shown passing through a bank of digital to analog converters 50 (i.e. D/A converter 32 of FIG. 1) which provide analog video output signals which may be combined with sync and blanking to form composite video whereby to display the masked video image on a video monitor.

The CPU interface (which may be an output port section of the CPU 22) has sixteen parallel address lines, eight data lines and two control (read/write) lines. The tri-state registers 48 are addressed through this interface, and data representing a desired mask color is written into these registers. The data is read out when the registers 48 are enabled.

The scanning logic 24 is provided by two eight-bit counters indicated as the X and Y counters 52 and 54. The pixel clock divided by two provides 256 clock pulses per horizontal line. The X counter is reset by horizontal sync. The Y counter is reset by vertical sync and counts the horizontal sync pulses. There may be 242 counts per video field if the half lines at the top and bottom of the screen are not included.

The plural mask store 26 is provided by random access memories (RAM) 56 and 58. These RAMs may be 1K by 8 RAMS, 8 bits wide and 1024 bits long (only 256 of the 1024 bytes being utilized). 8K by 8 RAMS may be used if available. The mask store also includes selectors 60 and 62 which are decoders for selecting, as by decoding, 1 bit of the 8 bits per byte. Each of the RAMS 56, 58 provides a different group of arrays—one bit (of the eight per byte) by 256 bits—which map the subsequently generated video display in X and Y coordinates. Each array can store a different one of eight masks (i.e. the coordinates which define a different mask). The selectors 60 and 62 select one array and therefore one mask.

Selectors 60 and 62 are connected to the CPU interface by way of a control register 74 having 3 output lines which select or decode 1 of the 8 arrays in RAM. In order to store the eight masks which are available for selection at any one time, tri-state buffers 64 and 66 are connected to eight of the sixteen address lines of the CPU interface. When enabled, they provide X and Y addresses defining different coordinates (different toggle points, $X_t$ and $Y_t$). Data is then written into the RAMS 56, 58 via tri-state transceivers 68 and 70. When transceivers 68, 70 are enabled, eight bit data is written in at the appropriate ones of the 256 bit locations in the RAMs 56, 58 in each of the 8 arrays. Writing is enabled through a control latch 72 which receives read write data from the R/W control lines. The data can be read out to the transceivers 68 and 70 and back into the CPU for test or verification purposes during the address mode, when the RAMS 56 and 58 are controlled by the CPU. During addressing and writing from the CPU, the CPU provides enable inputs to the counters 52 and 54 and to the buffers 64 and 66 to tri-state the counters and allow data from the buffers 64 and 66 to address the RAMS 56 and 58.

Counter 52 provides 256 8-bit counts for addressing addresses 0 255 of RAM 56. Similarly, 8-bit counter 54 provides 256 8 bit counts for addressing addresses 0 255 of RAM 58. As the counters cycle during each frame, the data representing the toggle point coordinates in the X and Y directions are read out to the selectors to provide the $X_t$ (X toggle) and $Y_t$ (Y toggle) data. This data is applied to the state logic until 28 through selectors 60, 62.

In operation, RAMS 56, 58 are addressed by CPU 22, and four logical one data bits are written therein for each mask two logical one data bits representing X toggle points $X_{t1, t2}$ are written into RAM 56, and two logical one data bits representing Y toggle points $Y_{t1, t2}$ are written into RAM 58. Portions of RAMs 56, 58 mpt defining mask toggle points are written with logical zeros. As the RAMs 56, 58 are read out by the counters 52, 54, data bits $X_{t1, t2}$ and $Y_{t1, t2}$ represent the coordinates on the video display defining the toggle points, or inside edges, of a mask.

At the occurrence of each VSYNC, the mask enable output of state logic 28 is set to enable a mask. That is, the mask enable output is set to a binary 1 bit, enabling multiplexer 18 to deliver the color mask register data to the digitized video output bus. While not required to generate a mask, this operation prevents system noise from disrupting normal mask operation, providing a self-recovery action for each video field.

As RAM 56 is read out by counter 52, data $X_t$ changes from zero to one at the left toggle point $X_{t1}$, and from one to zero at the location immediately after the toggle point $X_{t1+1}$ on each line. Data $X_t$ changes from zero to one at the right toggle point $X_{t2}$, and again back to zero at the location immediately after the toggle point $X_{t2+1}$. Similarly, as RAM 58 is read by counter 54, data $Y_t$ changes from zero to one at the top toggle point $Y_{t1}$ and then back from one to zero at the next Y bit location. This same zero to one, one to zero data transition repeats at the bottom toggle point, $Y_{t2}$. These four toggle points $X_{t1}$, $X_{t2}$, $Y_{t1}$, $Y_{t2}$ define a mask as shown in FIG. 4. Thus, as stated above, for each mask there are four toggle points represented by four one bits in otherwise zero'd arrays in RAMs 56, 58.

As data $X_t$, $Y_t$ is read from RAMs 56, 58, state logic 28 functions as separate toggle (flip-flop) state circuits for the $X_t$ and $Y_t$ inputs. The output of the $X_t$ state circuit toggles from a one to a zero at the left toggle point, and from a zero to a one at the right toggle point. The output of the $Y_t$ state circuit toggles from a one to a zero at the top toggle point, and from a zero to a one at the bottom toggle point. The state logic 28 further functions to logically OR the $X_t$ and $Y_t$ state circuit outputs. Accordingly, state logic 28 functions to control buffers 44 such that the mask data is selected from registers 48 when either the $X_t$ state circuit output or the $Y_t$ state circuit output represent logical one bits. Correspondingly, state logic unit 28 functions to control buffers 44 such that the output of the frame store 42 is selected when both $X_t$ and $Y_t$ state circuit outputs represent logical zero bits.

Synchronously with the scanning of RAMs 56, 58, controller 16 (FIG. 1) addresses the video data in frame store 42. The mask enable signal generated by state logic 28 enables the selection of the mask data from registers 48 outside of the inner mask edges as defined by the $X_t$ and $Y_t$ toggle points. Inside of these inner mask edges, the mask enable signal enables the buffers 44 to select video data from frame store 42, thereby creating an active image area within the mask.

It will be appreciated that $X_t$ —one—bits can be loaded in the mask store at several spaced points along the X axis of the screen and $Y_t$ one bits can be provided again at several spaced points so as to define a plurality of masked active image area. For example, with four $X_t$ logical one bits loaded in RAM 56, and four $Y_t$ logical one bits loaded in RAM 58, four active image areas of the type shown in FIG. 4 can be masked on a single video display.

It will be appreciated that although eight different masks are available at any one time, one or more of the masks which are in storage may be changed under operator control.

Figure 3:
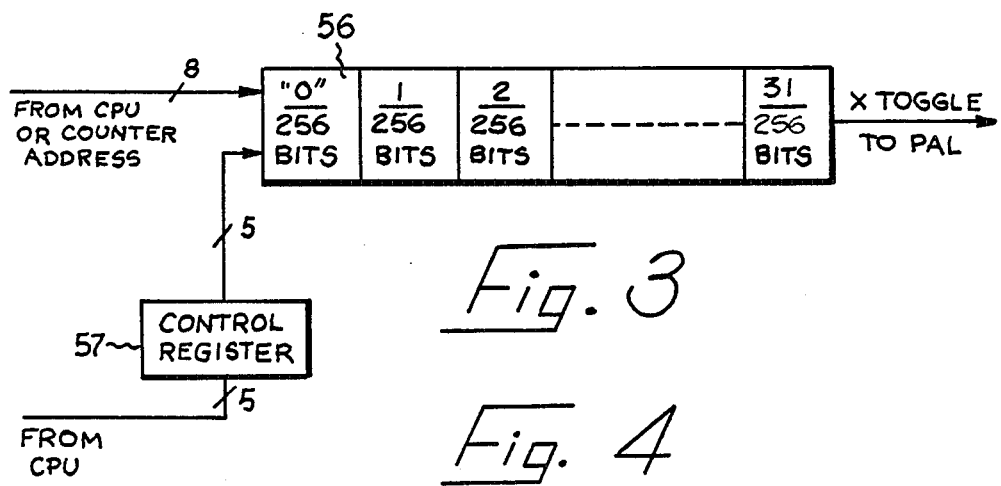
FIG. 3 is a block diagram of one array of the mask store which may be used in accordance with another embodiment of the invention.

In lieu of the use of selectors 60, 62, up to thirty-two different masks can be stored and be available when RAMs 56, 58 comprise 8K×8-bits of addresses. Any one of these 32 masks can be selected using the address lines from the CPU, for example as shown in FIG. 3 for RAM 56 (RAM 58 is organized in an identical manner). The RAM 56 is divided into thirty-two arrays of 256 bits long by eight bits wide. Each of these arrays may have data stored therein to represent a different combination of X coordinates. The data may be written into or read out of a selected one of the thirty two arrays using five of the sixteen CPU address lines to select one of the thirty-two arrays. A control register 57 is used to latch the five address lines for selecting the desired array (one of the thirty-two "pages" in RAM), and the 8-bit address from counter 52 (FIG. 2A) is used to address the data within the selected array. It will thus be appreciated that, with the embodiment of the invention shown in FIG. 3, thirty-two separate masks, rather than eight, are available at any one time.

From the foregoing description it will be apparent that there has been provided an improved video system for displaying masked video images. The system provides a high degree of flexibility by making available a multiplicity of different masks: i.e. eight masks as shown in the embodiment of FIG. 2 or thirty-two masks as shown in the embodiment of FIG. 3. These different masks may be selected to represent different photographic aspect ratios, giving the system particular application for displaying video proofs in a photographic studio environment. The system may further be used to mask multiple, active, video image areas.

While the invention has been described with respect to an interlaced video system, it will be understood that it is equally applicable to non-interlaced video systems. Further, the invention is not limited to masking still video images, but can also be used to mask real time (movie) video images by operating the frame store in a live video mode. Other variations and modifications within the scope of the invention will suggest themselves to those skilled in the art. Accordingly, the foregoing description should be taken as illustrative and not in a limiting sense.

What is claimed is:

1. A video system for displaying masked video images with a selected one of a plurality of bordering masks on a video monitor, said video system comprising:

first memory means for storing digital video data defining at least one of the video images to be displayed;

second memory means for storing digital mask data respecting a plurality of coordinates which define the inner edges of said masks;

means for addressing said second memory means to store said digital mask data for a plurality of different ones of said masks;

means for synchronously scanning said first and second memory means to read said digital video data and said digital mask data for a selected one of said masks;

means for providing digital mask color data defining the color of the selected mask; and means responsive to said digital mask data for selecting said digital color data outside of said mask inner edges and said digital video data inside of said mask inner edges so as to provide video information for displaying said masked video images on said monitor.

2. The system according to claim 1 wherein said digital mask color data providing means comprises:
   a register; and
   means for writing into said register digital data representing the color of the selected mask.

3. The system according to claim 1 wherein said first memory means comprises:
   a frame store for storing said digital video data representing a color video frame; and
   means for reading said digital video data out of said frame store.

4. The system according to claim 1 wherein:
   said second memory means includes first and second arrays of bit locations, said first array corresponding to a plurality of horizontal lines, each of said horizontal lines including a plurality of pixel locations, each of said pixel locations having an address along the horizontal (X) coordinate of said masked video image, said second array corresponding to a plurality of groups of horizontal lines, each of said groups corresponding to horizontal lines having addresses along the vertical (Y) coordinate of said masked video image; and
   said scanning means including means for selecting one of said plurality of horizontal lines from said first array and one of said groups from said second array whereby to select one of said plurality of masks.

5. The system according to claim 4 wherein said first and second arrays are provided by separate RAM devices.

6. The system according to claim 4 wherein said first and second arrays are each divided into a plurality of groups of locations at least equal in number to the number of pixel locations in each frame line for said first array and the number of horizontal lines per frame for said second array, and said scanning means comprises means for selecting one of said groups from said first array and one from said second array.

7. The system according to claim 4 wherein said first array has a plurality of parallel locations at least equal in number to the number of said pixels in a horizontal frame line and corresponding to a different order bit of a byte of digital data, and said second array also has a plurality of parallel locations at least equal in number to the number of horizontal lines in a frame, and each of said plurality of said parallel locations corresponding to a different order bit of a byte of digital data, said scanning means comprising means for selecting one of said plurality of parallel locations from said first array and one of said plurality of parallel location from said second array.

8. The system according to claim 4 wherein said scanning means comprises a separate digital counter for addressing each of said arrays.

9. The system according to claim 4 wherein said selecting means comprises means for combining the data from said first and second arrays for providing a logic signal to select said digital mask color data or said digital video data.

10. The system according to claim 9 wherein said combining means comprises a programmable logic array.

11. The system according to claim 9 wherein said selecting means further comprises a multiplexer controlled by said logic signal and having as inputs said digital mask color data and said digital video data.

* * * * *